United States Patent [19]

Johnson et al.

[11] Patent Number: 4,527,219
[45] Date of Patent: Jul. 2, 1985

[54] POLY(ARYLENE SULFIDE) ELECTRICAL COMPONENT

[75] Inventors: Timothy W. Johnson; Mark L. Stone, both of Bartlesville, Okla.

[73] Assignee: Phillips Petroleum Company, Bartlesville, Okla.

[21] Appl. No.: 543,580

[22] Filed: Oct. 19, 1983

[51] Int. Cl.³ .............................................. H01G 4/08
[52] U.S. Cl. .................................................. 361/323
[58] Field of Search .......................... 361/323, 433; 264/272.17, 272.18

[56] References Cited

U.S. PATENT DOCUMENTS

| 1,731,261 | 10/1929 | Pfiffner | 427/79 |
| 2,956,909 | 10/1960 | Robinson | 117/217 |
| 3,102,216 | 8/1963 | McGraw | 317/242 |
| 3,576,481 | 4/1971 | Rayburn | 317/260 |
| 3,689,810 | 9/1972 | Walles | 317/258 |
| 3,957,665 | 5/1976 | Jones | 361/323 |
| 4,183,600 | 1/1980 | Schroeder | 339/218 |
| 4,337,182 | 6/1982 | Needham | 524/690 |

FOREIGN PATENT DOCUMENTS

| 1940035 | 2/1971 | Fed. Rep. of Germany | 361/323 |
| 34395 | 3/1977 | Japan | 361/323 |
| 1106366 | 3/1968 | United Kingdom | 361/323 |

*Primary Examiner*—Donald A. Griffin

[57] ABSTRACT

A poly(arylene sulfide) capacitor is described comprising upper and lower poly(arylene sulfide) conductive layers and an intermediate poly(arylene sulfide) dielectric. The conductive layers are preferably chemically-doped amorphous poly(phenylene sulfide). A method of preparing such a capacitor from a film of poly(arylene sulfide) is described.

24 Claims, 2 Drawing Figures

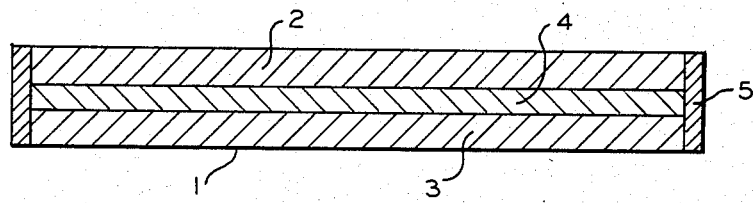
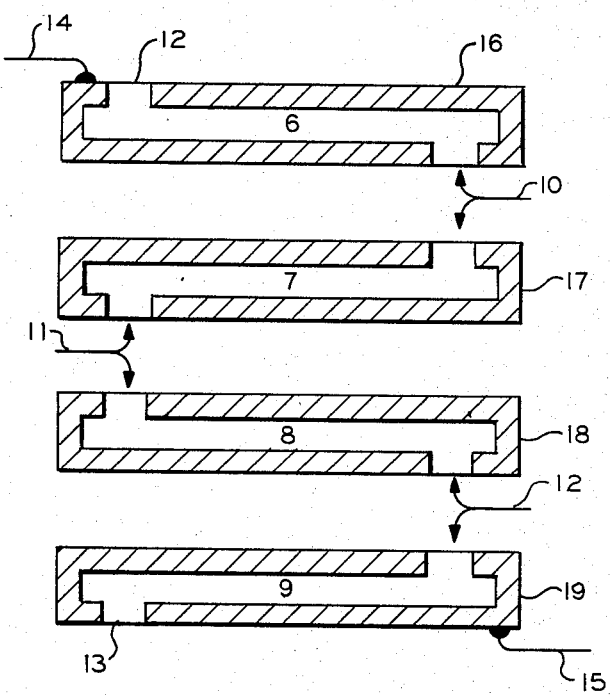
FIG. 1
FIG. 2

POLY(ARYLENE SULFIDE) ELECTRICAL COMPONENT

BACKGROUND OF THE INVENTION

This invention relates to electric capacitors. It further relates to all-plastic electric capacitors. In a specific embodiment, the invention relates to electric capacitors made from a doped film of poly(phenylene sulfide). In a further embodiment the invention relates to a method of manufacturing an all-plastic capacitor.

Capacitors are electrical devices for storing electrical charge. They are composed of two electrically-conductive plates separated by an insulating material or dielectric. The conductive plates are generally metal layers which are applied as a foil or by vacuum-metallization. Depending upon the type of capacitor, the sandwiched layer is an insulator such as mica, ceramic, polypropylene, polystyrene, or other insulating plastics.

The capacitance of such a capacitor with dielectric area A and uniform thickness t is proportional to A/t. In order to achieve the high capacitance required in some applications, t is generally made as small as possible consistant with retaining sufficient dielectric breakdown strength, and the effective area is increased, which may necessitate rolling or stacking to achieve a convenient package size and shape. The thickness of the metal layers must be sufficient to provide low electrical resistance to the charging and discharging processes.

The process of preparing the conductive/insulating laminate which makes up the capacitor is a multistep operation. For reasons of economy and efficiency, it would be desirable to simplify the procedure for making capacitors and to minimize the amount of metallic material present in the capacitor.

It is therefore an object of the present invention to prepare a capacitor comprising electrically-conductive poly(arylene sulfide). It is a further object of one embodiment of the present invention to prepare an all-plastic capacitor. It is a further object of one embodiment to prepare a capacitor in which the conductive layers and the insulating layer are produced from a single sheet of poly(arylene sulfide).

SUMMARY OF THE INVENTION

According to the invention, an electric capacitor is prepared from a poly(arylene sulfide). The capacitor comprises a layer of insulative poly(arylene sulfide) sandwiched between two conductive poly(arylene sulfide) layers. The conductive poly(arylene sulfide) layers can be, for example, amorphous poly(arylene sulfide) which has been exposed to a suitable dopant material. The insulative layer can be, for example, a crystalline or amorphous poly(arylene sulfide). The capacitor of the invention can be prepared by contacting an amorphous poly(arylene sulfide) film or sheet with a dopant so as to deposit the dopant into the thus-contacted film in such a fashion that the top and bottom doped surfaces of the sheet, the electrodes of the capacitor, are not in electrical contact. The thus-treated film, with upper and lower conductive layers and an intermediate dielectric, is a simple electrical capacitor. A plurality of thus-produced films can be laminated to form a further variety of the electrical capacitor.

BRIEF DESCRIPTION OF THE DRAWINGS

FIG. 1 is a cross-sectional view of one embodiment of the invention capacitor.

FIG. 2 is a cross-sectional view of a four-unit stacked capacitor showing the relative positions of the four units of the capacitor.

DETAILED DESCRIPTION OF THE INVENTION

The poly(arylene sulfide) useful in the invention article of manufacture can be any polymeric material comprising one or more aryl moieties having sulfide linkages. Suitable starting materials for the polymer are disclosed in U.S. Pat. Nos. 3,354,129 and 3,919,177, the disclosures of which are hereby incorporated by reference. Such polymers include those represented by the formula $(-R-S-)_n$ wherein R is a substituted or unsubstituted benzene ring and n is at least 50. The manufacture of poly(arylene sulfide) is known in the art. A polyhalosubstituted aromatic compound is reacted with a sulfur source in a polar organic solvent. In a commercial form of this process, para-dichlorobenzene is reacted with sodium sulfide in N-methylpyrrolidone solvent. A process for producing high molecular weight, film-grade poly(phenylene sulfide) is described in U.S. Pat. No. 3,919,177. According to the process described therein, p-dichlorobenzene is reacted with sodium sulfide in N-methylpyrrolidone solvent in the presence of an alkali metal carboxylate. The resulting polymer resin has a melt viscosity of 100 to 600,000 poise, preferably 300 to 100,000 poise at 300° C. and a shear rate of 200 $\text{sec}^{-1}$.

Suitable polyhalosubstituted aromatic compounds for producing poly(arylene sulfide) polymers and copolymers include 1,2-dichlorobenzene, 1,3-dichlorobenzene, 1,4-dichlorobenzene, 2,5-dichlorotoluene, 1,4-dibromobenzene, 2,5-dibromoaniline, 1,3,5-dichlorobenzene, and the like.

The preferred polymer in terms of its availability and properties is poly(phenylene sulfide), in which R is predominately an unsubstituted benzene ring. Poly(phenylene sulfide) is a thermoplastic polymer having a melting point of about 280° to 290° C. It is available in various forms as Ryton ® poly(phenylene sulfide), a product of Phillips Petroleum Company.

The poly(arylene sulfide) of the invention can be a copolymer of two or more aromatic monomers. Referring to the general $(-R-S-)_n$ formula above, the predominate R group in a copolymer will generally be p-phenylene with relatively minor amounts of, for example, aryl moieties such as o-phenylene, m-phenylene, methyl-p-phenylene, dimethyl-p-phenylene, or p, p-biphenylene although these can also comprise the majority of the R groups in a poly(arylene sulfide) polymer. The linkages for the aromatic moieties can include functionalities in addition to sulfide groups

and —O—, for example. Illustrative of suitable poly(arylene sulfide) copolymers are polybiphenyl/phenylene sulfide, polyphenylene sulfide ketone, and poly(thianthrenylene sulfide).

The electrically-conductive layers of the invention article of manufacture can be prepared by any suitable method of imparting electrical conductivity to the poly(arylene sulfide) material. For example, an amorphous poly(arylene sulfide) film or sheet can be treated with a chemical dopant. Chemical dopants include $AsF_5$ and $SbF_5$. The presently-preferred chemical dopant for amorphous poly(phenylene sulfide) is nitrosonium hexafluorophosphate, $NOPF_6$.

The insulating or dielectric layer can be any material having electrical insulating properties, such as mica, ceramic, polypropylene, or polystyrene. For producing the preferred embodiment of the invention, a crystalline or amorphous poly(arylene sulfide) dielectric layer is employed.

The inventive article of manufacture is most efficiently prepared by starting with an amorphous poly(arylene sulfide) film or sheet, (hereinafter "film"). The film is preferably, for preparing an electric capacitor, from about 1 mil to about 40 mils in thickness. It can be a crystalline poly(arylene sulfide) film which has been transformed to an amorphous film by a suitable method, such as quenching from a temperature above the melting point of the particular polymer, about 280° C. or greater for poly(phenylene sulfide), or it can be a poly(arylene sulfide) film which was manufactured by a process (described below) which produces films essentially lacking crystallinity.

The amorphous poly(arylene sulfide) film can be treated by any means effective for imparting electrical conductivity to the film. A suitable method is immersing the film in a solution of the chemical dopant for a time effective for the poly(arylene sulfide) to incorporate the desired amount of dopant. It is generally desirable to minimize the amount of oxygen and water in the doping environment.

A suitable doping technique for a poly(phenylene sulfide) film using nitrosonium hexafluorophosphate is is believed representative and is set out for purposes of illustration as follows. The solid $NOPF_6$ is mixed with a solvent such as a 70/30 volume ratio of nitromethane and methylene chloride in an inert, essentially dry oxygen-free atmosphere. The concentration of the $NOPF_6$ can vary but will generally be in the range of about 0.01M to about 0.2M. The poly(phenylene sulfide) film is placed in the solution in a dry nitrogen atmosphere at room temperature, with occasional stirring. The film is kept in the dopant solution for a time effective for incorporation of the dopant in the film, usually about 15 minutes to about 2 hours. During the doping process, the immersed polymer may acquire a dark color, indicating a chemical change in the polymer structure. A change in the morphology from amorphous to crystalline may also be produced by the dopant solvent. The film is removed and rinsed for a few minutes with pure nitromethane, and is then placed under a vacuum and pumped dry for a time which varies according to the circumstances such as doping time and film thickness, generally about 5 minutes to about 5 hours.

In order to produce a capacitor from a single film, a poly(arylene sulfide) film is contacted with the dopant for a period of time which results in less than complete saturation of the film by the dopant; e.g., the doping procedure is terminated before the solvent/dopant fronts have met within the film. The resulting film consists of two layers of conductive poly(arylene sulfide) separated by an undoped nonconducting layer. The conditions of the doping process control the thickness of the insulting layer. As a rule, it will be desirable to make the thickness of the insulating layer as small as possible but sufficiently thick to withstand the applied electrical voltage.

It is necessary to treat the edges of the film so as to prevent contact at the edges between the upper and lower conducting layers. This can be accomplished by, for example, trimming the doped edges with a sharp edge so as to expose the insulating layer. An alternative method of preventing edge contact of the conductive layers is to use an amorphous film having crystalline morphology along the edges. Such crystallinity can be induced at selected sites by, for example, heat- or solvent-treating the polymer at those sites. Solvents effective for inducing crystallinity in amorphous poly(arylene sulfide) include dichloromethane, chloroform, tetrahydrofuran and toluene. The crystalline areas being far less susceptible to doping than the amorphous areas, the crystalline areas are insulative and prevent conductance between the upper and lower doped areas.

A simple capacitor 1 as described above is shown in cross-section in FIG. 1, in which insulating, or dielectric, layer 4 is sandwiched between conducting layers 2 and 3. Crystallized edges 5 prevent electrical contact, or breakthrough, between the conductive layers.

Conductive leads can be attached with conductive adhesive or the like to form the capacitor. The capacitor can be encased with a suitable water-resistant material such as epoxy.

A stacked capacitor can be formed by laminating the capacitors described above, as shown in FIG. 2. A plurality of the above-described articles 16, 17, 18 and 19 each comprising two conducting layers and a sandwiched insulating layer are stacked on one another, with adjacent conducting layers in contact. In order to provide a continuous insulating layer throughout the device, the conductive surfaces of the separate devices contain non-conductive regions 10, 11, 12 and 13 patterned so as to contact a corresponding non-conductive layer of an adjacent device. These non-conductive regions can be conveniently produced by imparting crystallinity to the poly(arylene sulfide) at selected locations on the film. Such crystallinity can be induced, for example, by contacting an amorphous film surface with a suitable solvent, a source of heat, or a high-intensity light source such as a laser. Solvents which are useful for inducing crystallization in poly(phenylene sulfide) include dichloromethane, dichloroethane, chloroform, toluene, and tetrahydrofuran. Conductive leads 15 and 14 can be attached to the outer conductive layers of such a device to complete the stacked capacitor.

In an alternative embodiment, an all-plastic capacitor can be formed from two sheets of poly(arylene sulfide) film, one a thin, highly crystalline film and the other a thicker amorphous film doped through only a portion of its thickness. The capacitor is formed by rolling the two films tightly together.

In another alternative embodiment, an all-plastic capacitor can be prepared from two fully-doped poly(arylene sulfide) films separated by a thin, highly crystalline poly(arylene sulfide) film. The undoped film can have a crystallinity index in the range of about 30 to about 100 and a thickness of about 1 mil to about 5 mil. The amorphous film having dopant incorporated into one surface will have a thickness of about 1 mil to about 15 mil. Of course, conductive electrodes from the conductive layers complete the capacitor.

As used herein, "crystalline" and "amorphous" are terms well known in the art to refer to the molecular structure of the poly(arylene sulfide) polymer. "Amorphous" is generally used to describe a poly(phenylene sulfide) polymer having a crystallinity index (CI), as determined by X-ray diffraction, of about 0 to about 20, while "crystalline" generally refers to a polymer having a CI of about 20 to about 100.

An amorphous film of a poly(arylene sulfide) can be produced by methods known in the art. Generally, such methods include extruding a poly(arylene sulfide) film at a temperature between the melting point and about 350° C. followed by quenching below the glass transition temperature, as with cold rolls, to freeze the polymer in the amorphous state. A quench rate of at least about 5° C./sec is generally desired to produce an amorphous film having a crystallinity index of less than 15%. For illustration, a poly(phenylene sulfide) resin is extruded at above 280° C. and is rapidly quenched to less than 90° C. to produce an amorphous film.

EXAMPLE I

Eight samples of thin PPS film were rendered electroconductive by post-fabrication doping. The film used in this example was a high molecular weight slightly branched, poly(phenylene sulfide) having a flow rate of 50-70 g/10 min. The sample films varied in thickness from about 10 to 40 mils. Initially the film had a crystallinity index of 5.0, indicating that it was essentially amorphous.

The dopant employed was nitrosonium hexafluorophosphate ($NOPF_6$) obtained from Ozark-Mahoning. $NOPF_6$ was added to a 70/30 volume ratio of nitromethane and methylene chloride. The doping solution was prepared under an inert atmosphere.

The doping procedure involved immersing the sample films in the doping mixture at room temperature. The doping was performed within a glove bag, and the doping mixture was stirred occasionally during the immersion period. Experimental conditions and results are shown in Table I.

After removal of the films from the doping solution, the samples were rinsed in pure nitromethane, and were then placed in a vacuum chamber and pumped dry. The conductivity of each sample was determined by placing the sample into a specially-constructed sample holder which pressed two platinum contact wires each 1 cm long and separated by 1 cm onto the surface of the film. Using a potential of six volts, measured with a Kiethley 173A meter, the current passing through the sample was measured with a Kiethly model 610 electrometer. Resistance, bulk resistivity and bulk conductivity of each sample were calculated from the measured current.

TABLE I

| Sample Number | Experimental Conditions | | | | | Results Conductivity ($\Omega^{-1}cm^{-1}$) |
|---|---|---|---|---|---|---|
| | $NOPF_6$ g/100 ml[1] | Doping Time (min.) | CI[2] | Draw Ratio[3] | Heat Set | |
| 1 | 0.98 | 70 | — | — | — | $1.4 \times 10^{-2}$ |
| 2 | 0.71 | 30 +20 | 15 | 2x | — | $3.0 \times 10^{-5}$ $9.0 \times 10^{-4}$ |
| 3 | 0.71 | 60 | 24 | 4x | — | $2.8 \times 10^{-7}$ |
| 4 | 1.48 | 60 | 18 | 0 | no | $1.4 \times 10^{-2}$ |
| 5 | 1.48 | 60 | 20 | 3.5x | no | $1.4 \times 10^{-5}$ |
| 6 | 1.48 | 60 | 84 | 3.5x | yes | $3.0 \times 10^{-9}$ |
| 7 | 1.55 | 60 | 66 | — | — | $2.5 \times 10^{-7}$ |
| 8 | 1.55 | 60 | 75 | — | — | too low to read |

[1]added to A70/30 by volume mixture of nitromethane/methylene chloride.
[2]Crystallinity Index measured using a x-ray diffraction technique.
[3]Certains of the samples were biaxially drawn.

EXAMPLE II

The doping procedure used in example I was terminated before the dopant completely penetrated the thickness of the PPS film, thus forming conductive regions which included the edges of the film.

In order to form two electrically isolated conductive layers, the edges of the film were selectively heated by momentary exposure to a hot plate, thus crystallizing the edges to an essentially undopeable state. After exposing the selectively heat treated film to the doping medium, the resulting film comprised two electroconductive layers of PPS separated by a nonconducting PPS layer, e.g., an electrical capacitor as shown in FIG. 1 or a capacitive-type transducer for converting physical quantities into related electrical signals. Gold leads were attached with conductive adhesive. Results for seven capacitors are shown in Table II. The capacitance of a typical capacitor measuring 1 inch per side is 100-200 pF @ 1000 Hz.

TABLE II

| Capacitor[2] | Capacitance(pF)[1] | | | |
|---|---|---|---|---|
| | Initial | After Potting[2] | After 5 days | After 6 days |
| 1 | 160 | 146 | — | 38 |
| 2 | 147 | 96 | 62 | 62 |
| 3 | 159 | 85 | 44 | 42 |
| 4 | 1050 | — | — | 127 |
| 5 | 243 | — | 77 | 75 |
| 6 | 11400 | shorted | | |
| 7 | 5700 | — | 104 | 101 |

[1]Measured on an ESI 252 Impedence meter at 1 kHz.
[2]White epoxy patch.

EXAMPLE III

The all-plastic capacitors of Example 2 were measured for electrical frequency properties, and the results are recorded in Table III. The frequency dependence of capacitance portrayed in Table III indicates better performance at low frequencies than at high frequencies. This is apparently due to effective series resistance in the doped polymer layers. In addition, the capacitance data in Table II indicates a drop in capacitance with time. These data, while revealing deficiencies in the capacitors tested, illustrate the usefulness of doped poly(arylene sulfide) as a material for electrical components.

TABLE III

| Capacitor[2] Number | Capacitance (pF) at frequency (Hz)/Volts | | | | | | | |
|---|---|---|---|---|---|---|---|---|
| | 10/1 | 50/1 | 100/1 | 1k/1 | 10k/1 | 100k/1 | 1k/10 | 1/k/100 |
| 1 | 164 | 131 | 107 | 34 | 16 | 10 | 35 | 37 |
| 2 | | | 119 | 57 | 29 | 18 | 58 | 59 |
| 3 | | | 87 | 40 | 24 | 16 | 40 | 41 |

TABLE III-continued

| Capacitor[2] Number | Capacitance (pF) at frequency (Hz)/Volts | | | | | | | |
|---|---|---|---|---|---|---|---|---|
| | 10/1 | 50/1 | 100/1 | 1k/1 | 10k/1 | 100k/1 | 1k/10 | 1k/100 |
| 4 | | | 319 | 114 | 52 | 31 | 116 | 108 |
| 5 | | | 180 | 67 | 32 | 21 | 67 | 71 |
| 6 | | | dead | | | | | |
| 7 | | | 227 | 91 | 46 | 29 | 91 | 93 |
| PC[2] | | | 102 | 102 | 101 | 99 | 102 | 102 |

[1] Measured on a General Radio 1621 Precision Capacitance Measuring System. The capacitors were epoxy encapsulated.
[2] PC stands for a commercial capacitor used as a control. It was rated at 100pF @ 10%.

We claim:

1. A capacitor comprising a dielectric region between two conductive regions, said dielectric and conductive regions consisting essentially of poly(arylene sulfide).

2. The capacitor of claim 1 wherein the poly(arylene sulfide) comprises a chemically-doped poly(arylene sulfide).

3. The capacitor of claim 1 wherein the poly(arylene sulfide) comprises amorphous poly(arylene sulfide).

4. The capacitor of claim 1 wherein the poly(arylene sulfide) is in the form of a plurality of layered films having a continuous non-conducting region extending through the layered films.

5. The capacitor of claim 1 wherein the poly(arylene sulfide) comprises crystalline poly(phenylene sulfide).

6. The capacitor of claim 1 wherein the poly(arylene sulfide) comprises poly(phenylene sulfide) doped with a chemical doping agent.

7. The capacitor of claim 1 wherein the poly(arylene sulfide) is in the form of a poly(arylene sulfide) film having a first electrically-conductive layer and a second electrically-conductive layer and a dielectric layer positioned between the first and second electrically-conductive layers so as to prevent electrical contact between the electrically-conductive layers.

8. The capacitor of claim 1 further comprising a conductive lead from each of said conductive regions.

9. An article of manufacture comprising:
a first electrically-conductive poly(arylene sulfide) layer;
a second electrically-conductive poly(arylene sulfide) layer, the second electrically-conductive layer having no electrical contact with the first electrically-conductive layer; and
a dielectric poly(arylene sulfide) layer positioned between the first and second electrically-conductive layers.

10. The article of manufacture of claim 9 which consists of a single poly(arylene sulfide) film.

11. The article of manufacture of claim 9 in which the first and second electrically-conductive layers comprise a chemical dopant.

12. The article of manufacture of claim 11 in which the dielectric poly(arylene sulfide) layer comprises amorphous poly(phenylene sulfide).

13. A process for producing an electric capacitor comprising:
selectively inducing electrical conductivity in a poly(arylene sulfide) film so as to provide in the film an upper conductive region, a lower conductive region having no electric contact with the upper conductive region, and an intermediate dielectric region.

14. The process of claim 13 in which the electrical conductivity is selectively induced by chemically doping a poly(arylene sulfide) film with a doping agent.

15. The process of claim 13 in which the doping agent is nitrosonium hexafluorophosphate.

16. The process of claim 15 in which the doping agent is present in a solution of a solvent comprising a liquid selected from the group consisting of dichloromethane, dichloroethane, chloroform, tetrahydrofuran and toluene.

17. An electrical component produced by the method of claim 13.

18. A capacitor produced by the method of claim 13.

19. A transducer produced by the method of claim 13.

20. A capacitor comprising a poly(arylene sulfide) dielectric region between two chemically-doped poly(arylene sulfide) conductive regions.

21. A capacitor consisting essentially of poly(arylene sulfide), wherein the poly(arylene sulfide) is in the form of a poly(arylene sulfide) film having a first electrically-conductive layer and a second electrically-conductive layer and a dielectric layer positioned between the first and second electrically-conductive layers so as to prevent electrical contact between the electrically-conductive layers.

22. The capacitor of claim 21 in which the first and second electrically-conductive layers are chemically-doped poly(phenylene sulfide).

23. The capacitor of claim 22 in which the dielectric layer is crystalline poly(phenylene sulfide).

24. The capacitor of claim 21 having a gold lead from each of said conductive regions.

* * * * *